US012623391B2

(12) United States Patent
Chapman et al.

(10) Patent No.: US 12,623,391 B2
(45) Date of Patent: May 12, 2026

(54) SURFACE FINISH MANUFACTURING SYSTEM AND PROCESS

(71) Applicant: EVA LAST HONG KONG LIMITED, Kowloon (HK)

(72) Inventors: Wesley Raymond Chapman, Johannesburg (ZA); Donghui Huang, Xuancheng (CN); Daoyuan Tang, Xuancheng (CN); Tangyong Dan, Xuancheng (CN); Gareth Wade Gadsby Chapman, Johannesburg (ZA)

(73) Assignee: EVA LAST HONG KONG LIMITED, Kowloon (HK)

( * ) Notice: Subject to any disclaimer, the term of this patent is extended or adjusted under 35 U.S.C. 154(b) by 464 days.

(21) Appl. No.: 17/771,446

(22) PCT Filed: Oct. 24, 2020

(86) PCT No.: PCT/IB2020/060009
§ 371 (c)(1),
(2) Date: Apr. 22, 2022

(87) PCT Pub. No.: WO2021/079353
PCT Pub. Date: Apr. 29, 2021

(65) Prior Publication Data
US 2022/0396090 A1 Dec. 15, 2022

(30) Foreign Application Priority Data

Oct. 24, 2019 (CN) .......................... 201911016758.3

(51) Int. Cl.
*B29C 48/15* (2019.01)
*B29C 48/00* (2019.01)
(Continued)

(52) U.S. Cl.
CPC ........ *B29C 48/002* (2019.02); *B29C 48/0012* (2019.02); *B29C 48/0021* (2019.02);
(Continued)

(58) Field of Classification Search
CPC ... B29C 48/002; B29C 48/154; B29C 48/155; B44C 3/005; B44C 1/222; B44C 9/02; B44F 9/02
See application file for complete search history.

(56) References Cited

U.S. PATENT DOCUMENTS

| | | | | |
|---|---|---|---|---|
| 5,534,352 A | | 7/1996 | Pittman et al. | |
| 6,716,522 B2 * | | 4/2004 | Matsumoto | ............. B29C 48/86 |
| | | | | 428/326 |

(Continued)

FOREIGN PATENT DOCUMENTS

| | | | | | |
|---|---|---|---|---|---|
| CA | 2144566 A1 | | 9/1996 | | |
| CN | 102294812 A | * | 12/2011 | ............. | B29C 47/92 |

(Continued)

OTHER PUBLICATIONS

International Search Report and Written Opinion for PCT/IB2020/060009 dated Mar. 4, 2021, 13 pages.

*Primary Examiner* — Atul P. Khare
(74) *Attorney, Agent, or Firm* — Sheppard, Mullin, Richter & Hampton LLP

(57) ABSTRACT

This invention relates to a surface finish manufacturing system and process and more particularly, but not exclusively, to a contrast surface finish manufacturing system and process for producing boards with a wood texture finish. The surface finish manufacturing system comprises a top layer and a bottom layer where part of the top layer is removed to expose part of the bottom layer.

5 Claims, 13 Drawing Sheets

(51) Int. Cl.

| | |
|---|---|
| *B29C 48/07* | (2019.01) |
| *B29C 48/154* | (2019.01) |
| *B29C 48/17* | (2019.01) |
| *B29C 59/04* | (2006.01) |
| *B44C 1/24* | (2006.01) |
| *B44C 5/04* | (2006.01) |
| *B44F 9/02* | (2006.01) |
| *E04F 15/10* | (2006.01) |
| *B29C 44/32* | (2006.01) |
| *B29C 44/50* | (2006.01) |
| *B29L 7/00* | (2006.01) |
| *B29L 9/00* | (2006.01) |

(52) U.S. Cl.
CPC ............ *B29C 48/07* (2019.02); *B29C 48/154*
(2019.02); *B29C 48/17* (2019.02); *B29C*
*59/046* (2013.01); *B44C 1/24* (2013.01); *B44C*
*5/0453* (2013.01); *B44F 9/02* (2013.01); *E04F*
*15/105* (2013.01); *E04F 15/107* (2013.01);
*B29C 44/321* (2016.11); *B29C 44/505*
(2016.11); *B29L 2007/001* (2013.01); *B29L*
*2007/002* (2013.01); *B29L 2009/00* (2013.01)

(56) References Cited

U.S. PATENT DOCUMENTS

| | | | | |
|---|---|---|---|---|
| 7,507,464 | B2 * | 3/2009 | Walrath | ................ B32B 37/153 |
| | | | | 428/327 |
| 8,168,104 | B2 * | 5/2012 | Han | ...................... B44B 5/0009 |
| | | | | 264/177.17 |
| 10,464,283 | B2 * | 11/2019 | Maier | ....................... B44C 1/24 |
| 10,981,350 | B1 * | 4/2021 | Stephens | ................... B32B 7/02 |
| 11,878,455 | B2 * | 1/2024 | Stanhope | ............. B29C 48/022 |
| 2003/0021915 | A1 * | 1/2003 | Rohatgi | .................. C08L 97/02 |
| | | | | 264/211.23 |
| 2005/0003221 | A1 | 1/2005 | Walrath | |
| 2009/0155612 | A1 | 6/2009 | Perven et al. | |
| 2017/0260755 | A1 * | 9/2017 | Sherstad | ................ B29C 48/06 |
| 2019/0070893 | A1 | 3/2019 | Chen et al. | |
| 2021/0363762 | A1 * | 11/2021 | Huang | ..................... B32B 5/18 |

FOREIGN PATENT DOCUMENTS

| | | |
|---|---|---|
| GB | 2100198 A | 12/1982 |
| WO | 2010009571 A1 | 1/2010 |

* cited by examiner

17

SURFACE FINISH MANUFACTURING SYSTEM AND PROCESS

CROSS REFERENCE TO RELATED APPLICATION

This application is the U.S. National Stage Application of International Application No. PCT/IB2020/060009, filed Oct. 24, 2020, which claims priority to Chinese Patent Application CN 201911016758.3, filed Oct. 24, 2019. The content of each of these applications is incorporated herein by reference in its entirety.

FIELD OF THE INVENTION

This invention relates to a surface finish manufacturing system and process and more particularly, but not exclusively, to a contrast surface finish manufacturing system and process for producing boards with a wood texture finish.

BACKGROUND TO THE INVENTION

There are many articles that have a wood-like finish. Such articles include cladding boards, floorboards, deck boards and the like. Whilst a natural, wood-like finish is desired, it is not always easy to achieve.

The characteristics of natural wood influences the appearance of planks or boards that are cut from logs. These characteristics include summer and winter growth rings which differ both in thickness and colour; sap wood and core or hardwood also have colour as well as texture differences; natural flaws or injuries and branching locations along a log, show up in planks cut from a log.

The method of sawing planks from a log also influences the appearance of planks. Refer, for example, to FIG. 1 which shows flat sawing, or FIG. 2, which shows quarter sawing. An alternative, which is quite similar to quarter sawing is rift sawing. These sawing methods will obviously influence the visual appearance and finish of planks. An example of a wooden plank is shown in FIG. 3.

A log can also have colour, thickness and texture differences along the length of the log. All of these factors contribute and make it difficult to imitate a natural wood finish.

Natural wood planks thus have different colours, textures and patterns. The transition from one colour, texture and/or pattern can be gradual or abrupt, in the same plank. It has been found that an abrupt change in colour, texture and/or pattern in a plank or an abrupt change in colour, texture and/or pattern together with gradual changes of these qualities, in other areas of the same plank, is the most difficult to emulate. Colour contrasts can also change gradually and/or abruptly in the same plank. This is also an important characteristic to imitate.

OBJECT OF THE INVENTION

It is an object of this invention to provide surface finish manufacturing system and process that, at least partially, alleviate some of the above-mentioned difficulties.

SUMMARY OF THE INVENTION

In accordance with this invention there is provided a surface finish manufacturing system comprising a top layer and a bottom layer where part of the top layer is removed to expose part of the bottom layer.

There is provided for part of the top layer and/or part of the top layer and part of the bottom layer to be planed and/or brushed off and/or sanded off and/or burned away and/or embossed.

There is provided for part of the bottom layer and/or part of the top layer to be uneven.

There is provided for the uneven bottom layer and/or top layer to be embossed with a pattern.

There is provided for the bottom layer and/or top layer to be extruded to form an uneven profile.

There is further provided for the top layer and/or bottom layer to be manufactured from an opaque material.

There is further provided for the top layer and/or bottom layer to be a UV resistant material.

There is provided for the top layer and/or bottom layer to be a composite material.

There is further provided for the top layer and/or bottom layer to be an acrylic material.

There is also provided for a contrast in colour between part of the top layer and part of the bottom layer when part of the top layer is removed.

There is further provided for the contrast between part of the top layer and part of the bottom layer to resemble year rings of a tree.

There is provided for the top layer and bottom layer to form a deck board.

The deck board includes a top layer and a bottom layer. Alternatively, the deck board may include a top layer, a bottom layer and a lower base layer.

The base layer is a material such as wood, synthetic material, aluminium or the like.

In accordance with this invention there is provided a surface finish process comprising the steps of:

Co-extruding a top layer and a bottom layer; and removing part of the top layer or part of the top layer and part of the bottom layer.

A further step of the above process includes embossing part of the top layer and/or part of the top layer and part of the bottom layer.

A further step of the above process includes co-extruding the top layer and/or the top layer and the bottom layer to have an uneven profile.

A further step of the above process includes part of the top layer or part of the top layer and part of the bottom layer to be removed by planing and/or brushing and/or sanding and/or burning and/or embossing.

A further step of the above process includes exposing a contrast in colour and/or a contrast in material when part of the top layer and/or part of the top layer and part of the bottom layer is removed.

A further step of the above process includes the contrast defining an abrupt change from one colour to another or a gradual change from one colour to another or a combined colour when part of the bottom layer is visible through part of the top layer.

A further step of the above process includes exposing a pattern when part of the top layer and/or part of the top layer and part of the bottom layer is removed.

In accordance with a second aspect of the invention there is provided for a surface finish manufacturing system, comprising a foamed base formed of a resin and having a block structure, and a hard skin layer integrally connected with the foamed base and covering at least one side thereof, the hard skin layer including a first exposed face formed of a first colour resin parallel to one side of the foamed base, and a second exposed face formed of a second colour resin; the second exposed face being at a smaller distance from the surface of the foamed substrate covered than the first exposed face; the first exposed surface is composed of a plurality of exposed units in the same plane, the second exposed surface is composed of a plurality of sunken units, and the exposed units and the sunken units are arranged in a staggered mode; the hard surface layer further comprises a connecting unit between the adjacent exposed units and the sunken units, wherein the connecting unit comprises a connecting substrate which is formed by first colour resin and is integrally connected with the first exposed surface and a connecting surface material which is covered on the connecting substrate and is formed by second colour resin and is integrally connected with the second exposed surface; and, the said hard surface layer also includes the base course that is formed by the first colour resin and is connected with the connection substrate integrally and covered by the said second exposed surface; the first colour resin is different in colour from the second colour resin.

There is further provided for the foaming matrix of the floor to be made of PVC foaming material, and the hard surface layer (2000) is made of ASA non-foaming material.

There is further provided for the first exposed surface to have a thickness of not less than 0.1 mm, and the second exposed surface to have a thickness of not less than 0.05 mm.

There is provided for the foamed base of the floor to be fed from a main extruder, the first exposed surface formed by the first colour resin, the connecting substrate and the base layer are fed from one sub-extruder, and the second exposed surface formed by the second colour resin and the connecting surface material are fed from the other sub-extruder.

In accordance with this invention there is provided a surface finish process comprising the steps of:

adding raw materials and additives for forming a foaming matrix into a main extruder, melting and plasticizing the raw materials and the additives in the main extruder, feeding the raw materials and the additives into a main runner of a mould, extruding the raw materials and the additives from a die lip of the main runner, and feeding the raw materials and the additives into a foaming cavity of the mould for foaming to form the foaming matrix;

adding raw materials and additives for forming first colour resin into a first auxiliary extruder, adding raw materials and additives for forming second colour resin into a second auxiliary extruder, respectively melting and plasticizing the materials in the first auxiliary extruder and the second auxiliary extruder, respectively entering a first auxiliary flow channel and a second auxiliary flow channel of a mould, respectively allowing the molten materials to flow out from a straight port of the first auxiliary flow channel and a straight port of the second auxiliary flow channel through transverse diffusion of the first auxiliary flow channel and the second auxiliary flow channel, allowing the molten materials to layer and coat a foaming matrix, and performing co-extrusion and extrusion from a die orifice of the mould to form a floor precursor structure; the floor precursor structure has a foamed substrate, a first skin layer and a second skin layer, the second skin layer being disposed between the first skin layer and the foamed substrate;

cooling and forming the floor front body structure;

subjecting the cooled and formed floor precursor structure to surface heating to soften at least the first surface layer;

pressing a partial area of the first surface layer below the surface of the second surface layer by embossing processing of an embossing roller so that the first surface layer and the second surface layer jointly represent a pre-state of wood grains;

a grinding process, wherein the first surface layer which is not pressed below the surface of the second surface layer is abraded, and the second surface layer is displayed at the corresponding part of the abraded area; so that the former state of the wood grain is transformed into the wood grain.

A further step of the above process includes the temperature of the first skin layer to be controlled within 250° C. during surface heating.

A further step of the above process includes heating by adopting a tunnel type drying oven during surface heating, controlling the temperature in the drying oven to be 150-250° C. and controlling the time to be 3-20 s.

A further step of the above process includes the embossing roller to be a cold roller during the embossing treatment of the embossing roller.

A further step of the above process includes polishing by using a sander.

These and other features of invention are described in more detail below.

BRIEF DESCRIPTION OF THE DRAWINGS

Embodiments of the invention are described below by way of example only and with reference to the drawings in which:

FIG. 21 is a front view of the B plate of 20; and

DETAILED DESCRIPTION OF THE DRAWING

Figure 1:
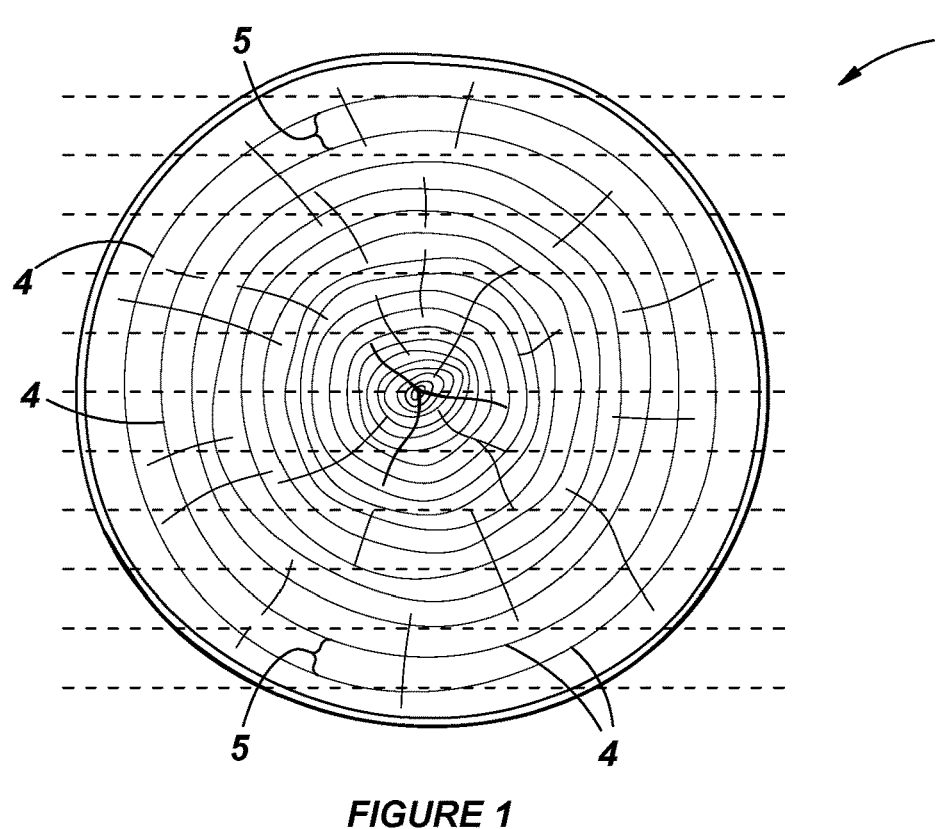
FIG. 1 shows a sectional front view of a tree trunk and broken lines indicating how planks are cut from the tree trunk.
Figure 2:
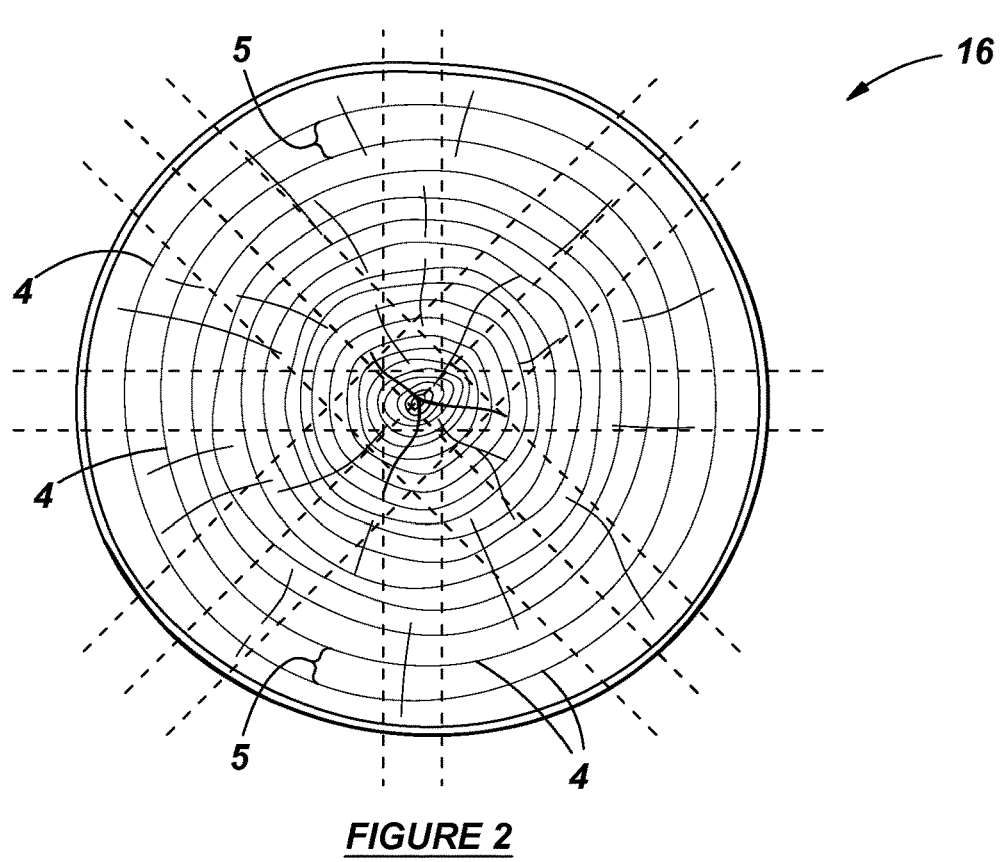
FIG. 2 shows a sectional front view of a tree trunk and broken lines showing an alternative for cutting planks from the tree trunk.

With reference to FIGS. 1 to 17, a surface finish manufacturing system is generally indicated by reference numeral 1.

In this example the article to which the surface finish manufacturing system and method relates is a deck board.

Figure 5:
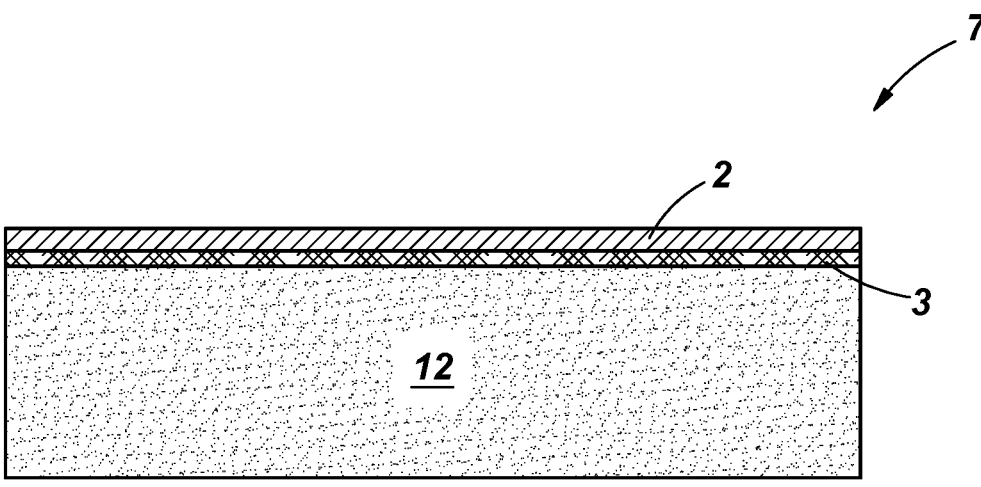
FIG. 5 shows an end view of a co-extruded deck board.

The deck board 7 is a co-extruded board and has a core 12, a bottom layer 3 and a top layer 2, as is shown in FIG. 5.

The core 12 is made from a lightweight composite plastics material. The composite material is extruded into a rectangular shape. Alternatively, the core may be a hollow aluminium extruded rectangular tube. It will be appreciated that the core can be made of any convenient material, for example, a foam board.

A bottom layer 3 is co-extruded onto a top surface of the core 12. The bottom layer 3 may be made from an acrylic, an opaque plastics material or a composites material. The bottom layer 3 is a UV resistant material. The bottom layer 3 is a first colour, for example, brown.

A top layer 2 is co-extruded onto a top surface of the bottom layer 3. The top layer 2 may be made from an acrylic, an opaque plastics material or a composites material. The top layer 2 is a UV resistant material. The top layer 3 is a second colour, for example, yellow.

Figure 4:
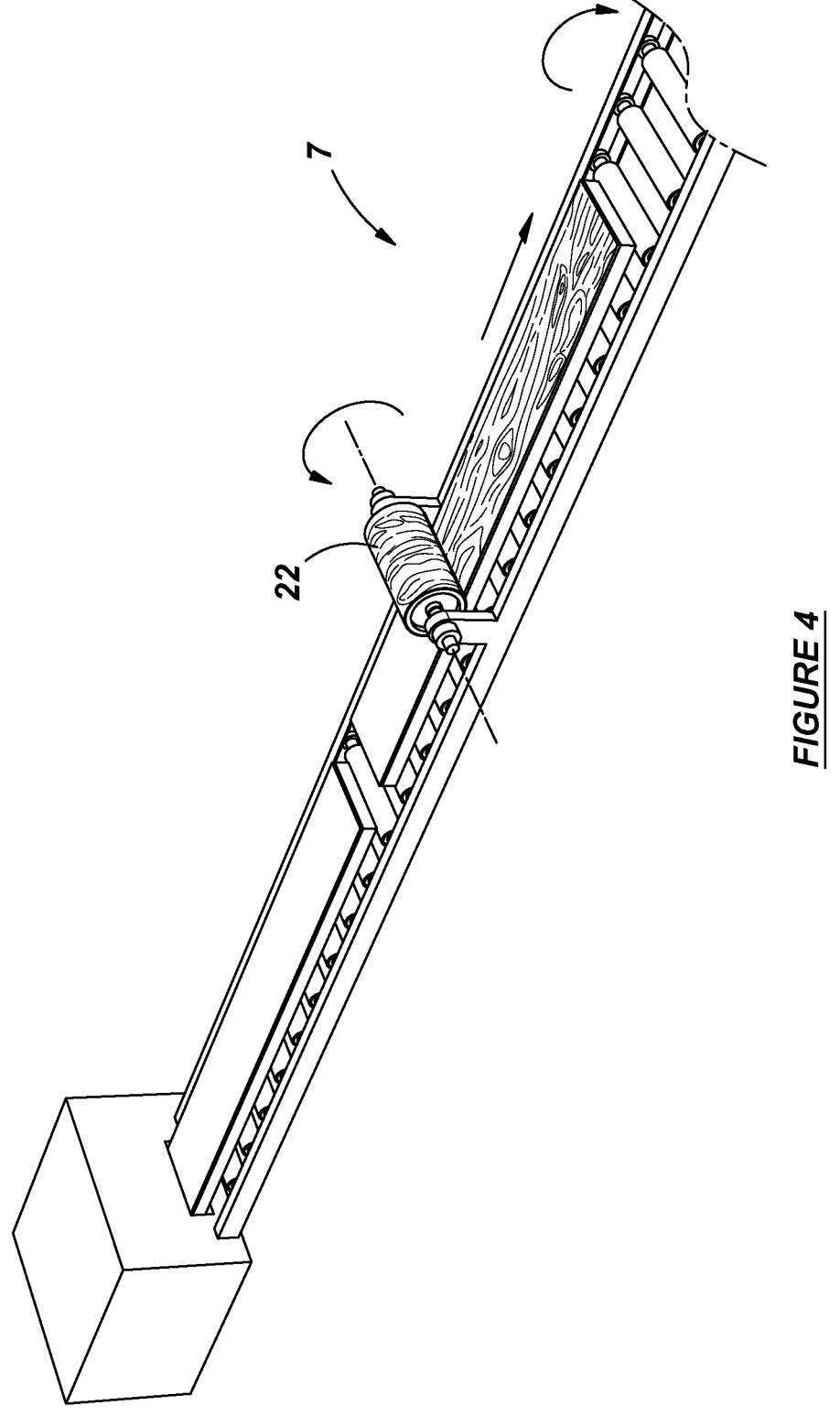
FIG. 4 shows a perspective view of an extruder and an embossing roller embossing a deck board.

After the decking board 7 is co-extruded, the board 7 is conveyed from an exit of the extruder to an embossing machine, as is shown in FIG. 4. The embossing machine has an embossing roller 22 and conveying rollers for conveying a board thereon. Any other means may be used to make to make the top and/or bottom layer uneven as shown in FIGS. 6 to 8, 10, 12, 14 and 16.

Figure 3:
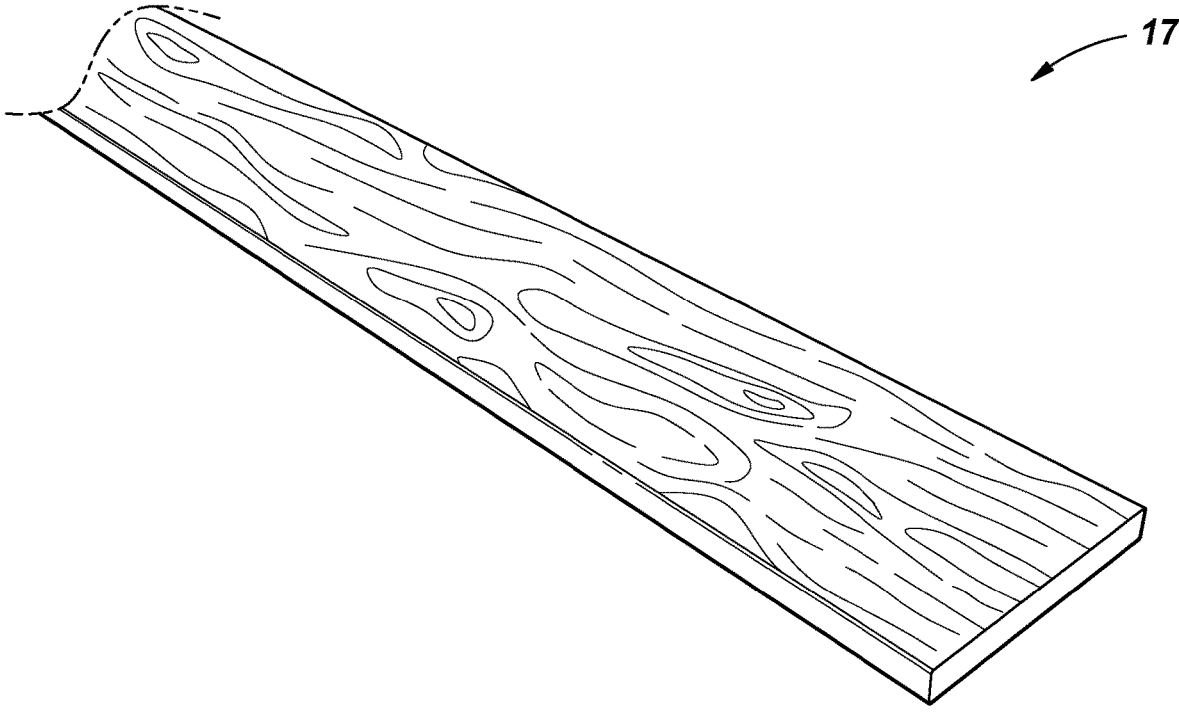
FIG. 3 shows a perspective view of a plank cut from a tree trunk.

The embossing roller is located above conveying rollers. The embossing roller is spaced apart from the conveying rollers. The embossing roller has a pattern on an outer surface thereof that resembles a wood finish, as is shown in FIG. 3.

When the board is conveyed from the co-extruder to the embossing machine, the top layer 2 is at an operatively upper end of the board 7. The material of the board 7 is not yet set and is therefore still deformable. The board 7 moves between the conveying rollers and embossing roller 22 and the embossing roller 22 presses on the board to force the wood finish pattern into the top and bottom layers of the board. In this manner, the embossing forms uneven corrugations along the length of the top layer 2, bottom layer 3 and upper surface of the core 12. The uneven corrugations of the top layer 2, bottom layer 3 and upper surface of the core 12 correspond with each other in a sectional end view, as is shown in FIG. 6.

Figure 6:
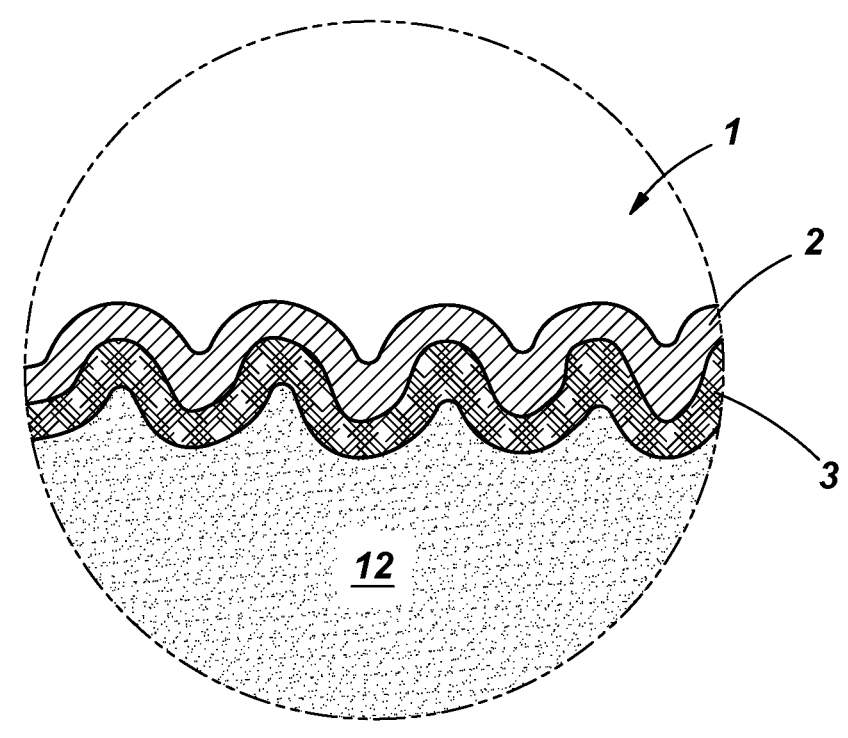
FIG. 6 shows a sectional end view of an embossed deck board.
Figure 7:
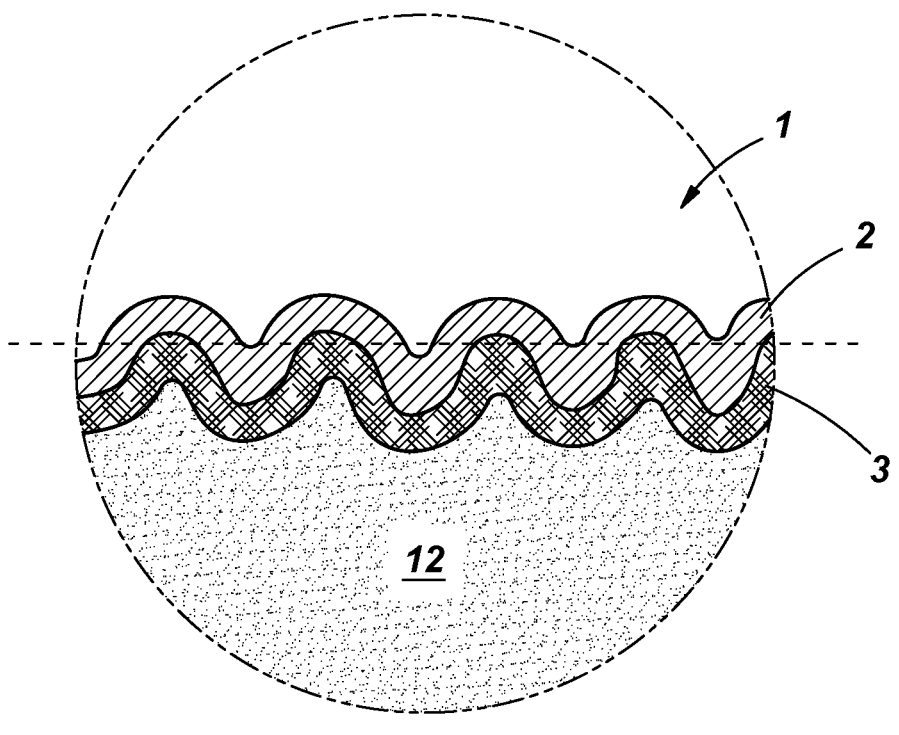
FIG. 7 shows a sectional end view of an embossed deck board and a broken line indicating where part of top layer and part of the bottom layer are removed.
Figure 8:
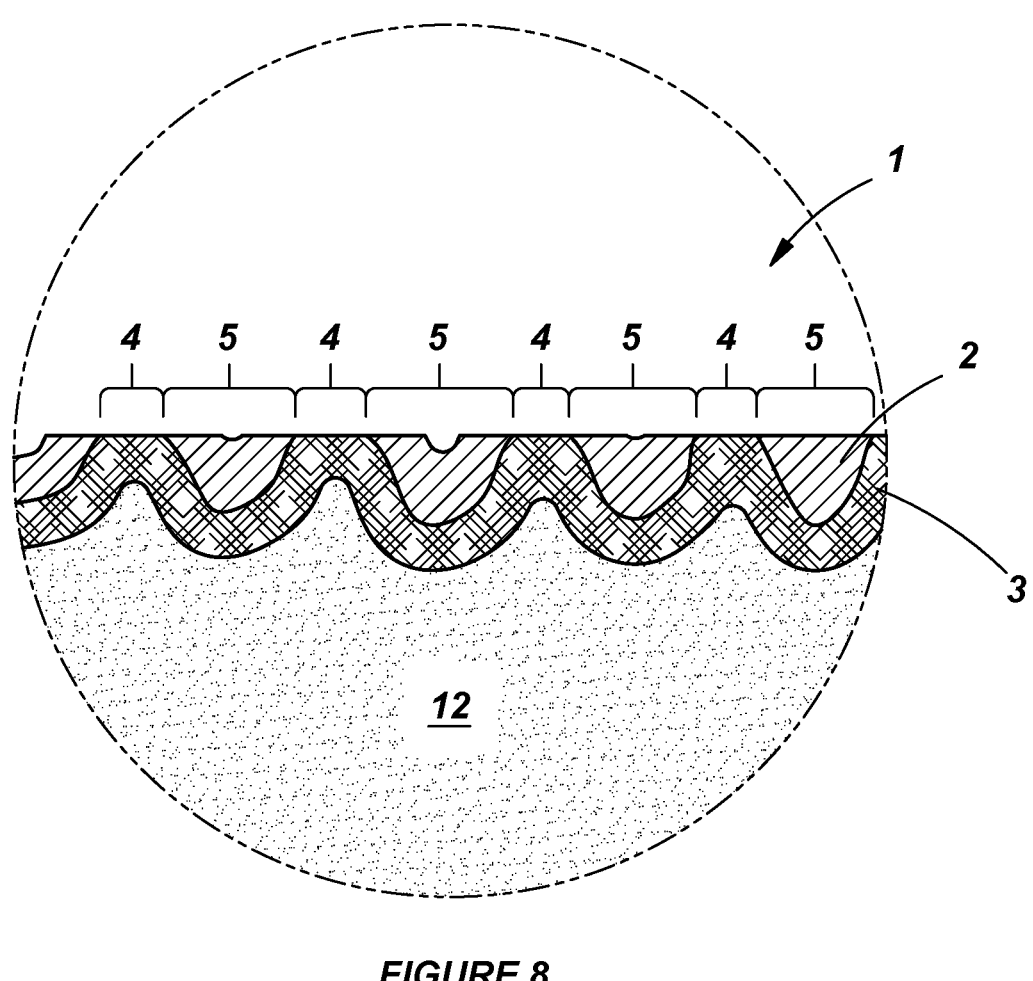
FIG. 8 shows a sectional end view of an embossed deck board with part of the top and bottom layers removed.

FIGS. 6 to 8 show removal of part of the top layer 3 and bottom layer 2 from the board 7. A flat top surface is formed, as shown in FIG. 8, that displays part of the top layer 2 and bottom layer 3. In other words, part of the top layer 3 and bottom layer 2 are visible.

A number of methods may be used to remove part of the top layer 2 or top layer 2 and bottom layer 3, including sanding, brushing, planing and/or burning.

Figure 9:
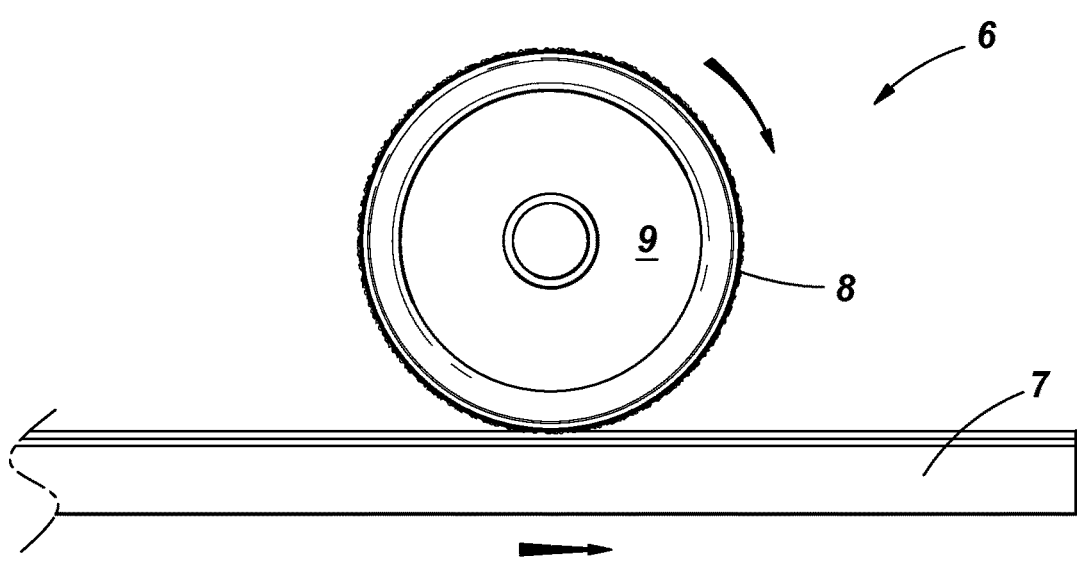
FIG. 9 shows a left side view of a sander for sanding part of a top layer and part of a bottom layer of the decking board of FIG. 6 off.
Figure 10:
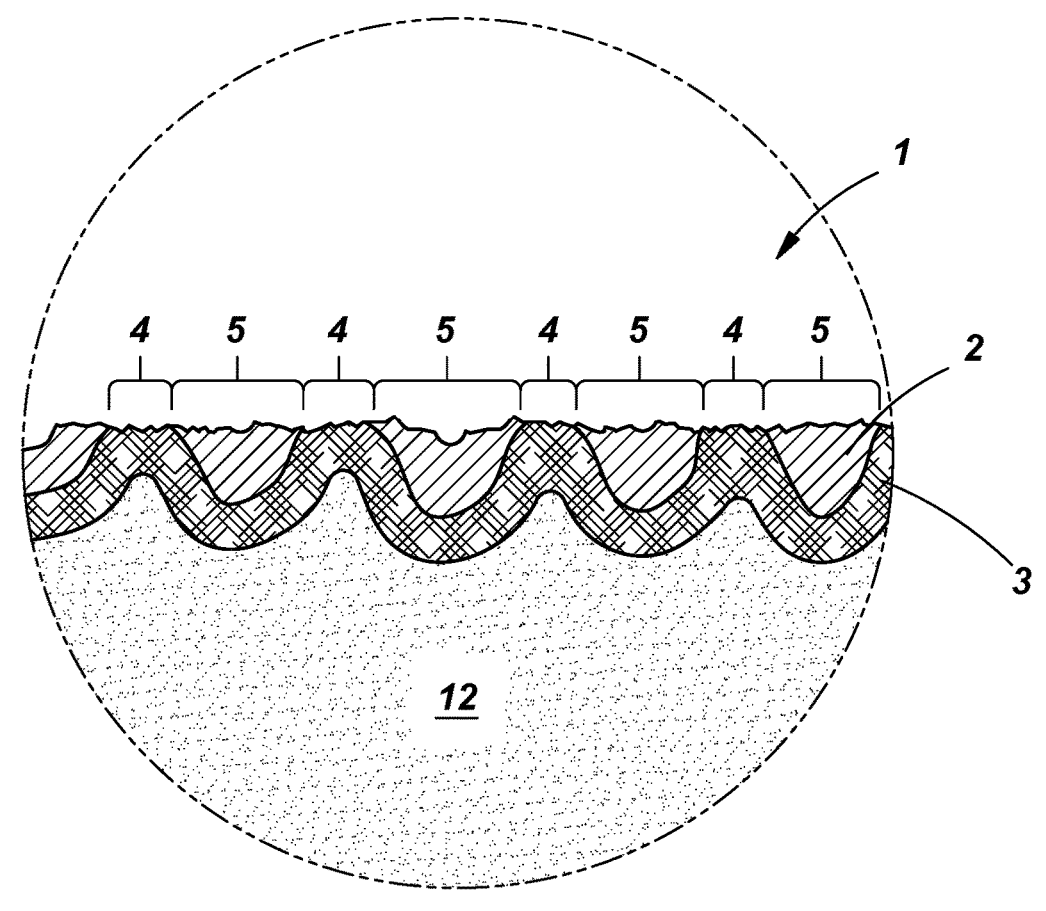
FIG. 10 shows a sectional end view of the decking board of FIGS. 6 and 9 where part of the top layer is sanded off.

The method of sanding is shown in FIG. 9. The sander 6 has a drum 9. Sanding paper 8 extends around an outer circumference of the drum 9. A grit size of the sanding paper is selected depending on the required roughness of the upper surface of the board 7. The drum rotates in a clockwise direction. The board 7 passes underneath the sander roller 6 to remove part of the top layer 2 and part of the bottom layer 3. As shown in FIG. 10, after parts of the top layer 2 and bottom layer 3 are removed, the board 7 displays part of the top layer 2 and part of the bottom layer 3. The layers shown may represent year growth rings 4 and 5 of a tree. The top surface of the board is rough from the sanding.

Figure 11:
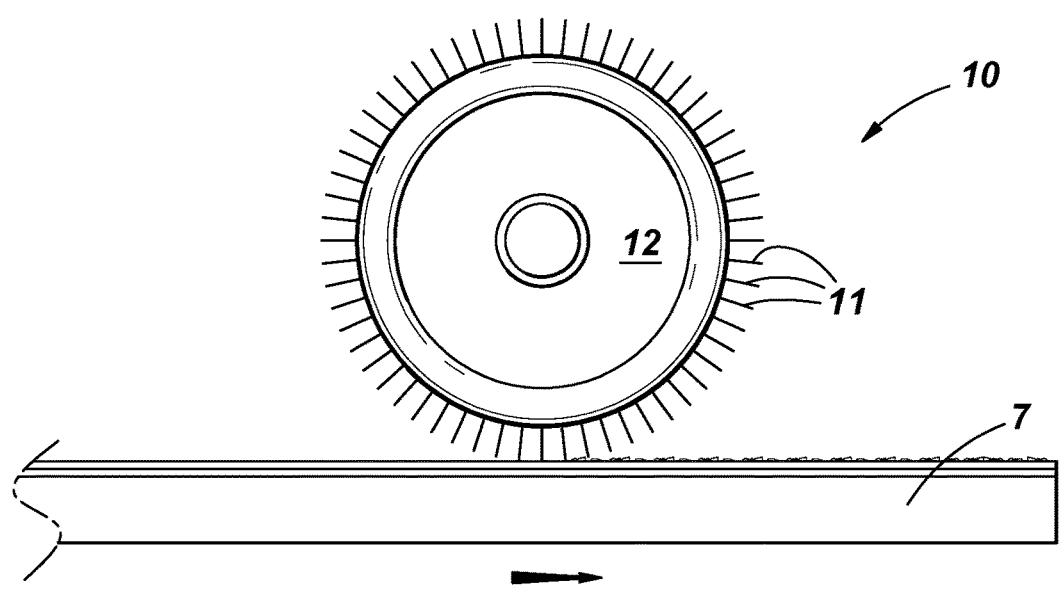
FIG. 11 shows a left side view of a brush roller for brushing part of the top and bottom layers of the decking board of FIG. 6.
Figure 12:
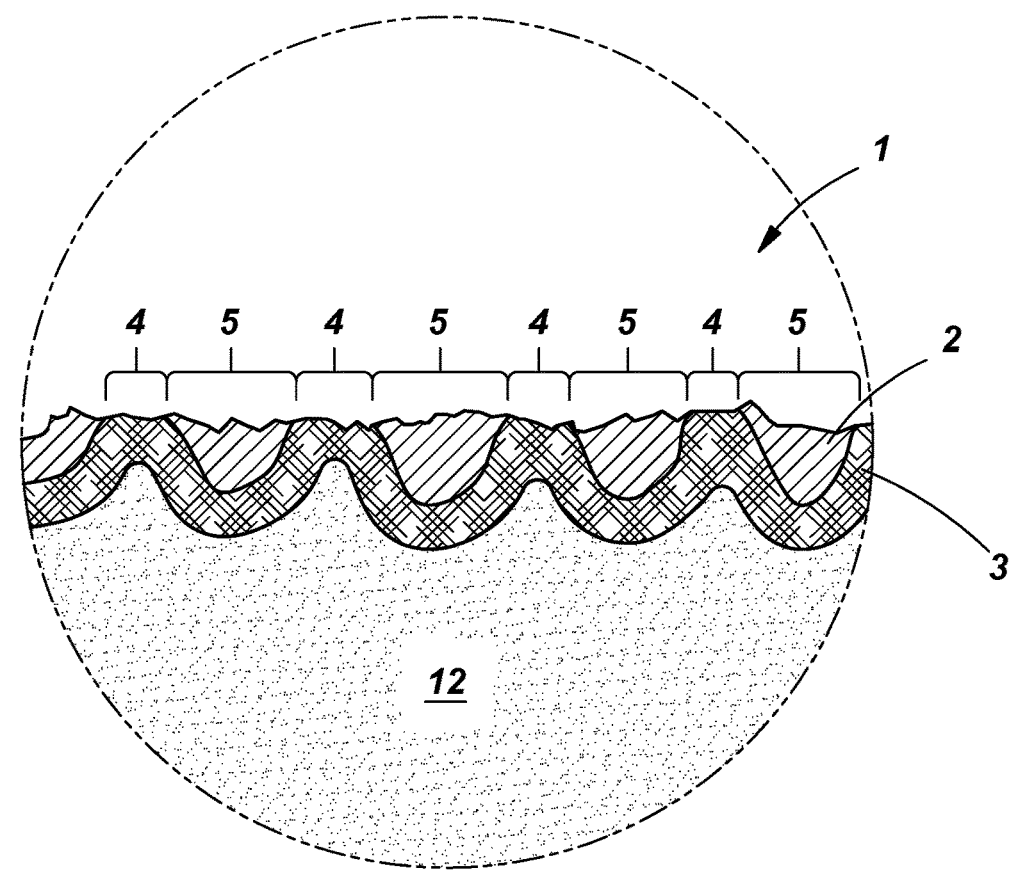
FIG. 12 shows a sectional end view of the deck board of FIG. 11 where part of the top and bottom layers are brushed off.

The method of brushing is shown in FIG. 11. The brush 10 has a drum 12. Bristles 11 extend around an outer circumference of the drum 12. The drum 12 rotates in a clockwise direction. The board 7 is placed on a rear side of the brush 10. The top layer 2 is directed towards the brush 10. The board 7 passes underneath the brush 10 so that the bristles remove parts of the top and bottom layers. As shown in FIG. 12, after parts of the top layer 2 and bottom layer 3 are removed, the board 7 displays part of the top layer 2 and part of the bottom layer 3. The layers shown may represent year growth rings 4 and 5 of a tree. The top surface of the board is rough and uneven from the bristles. The bristles may be made from different materials, may be of different stiffness or hardness and may also be of different lengths.

Figure 13:
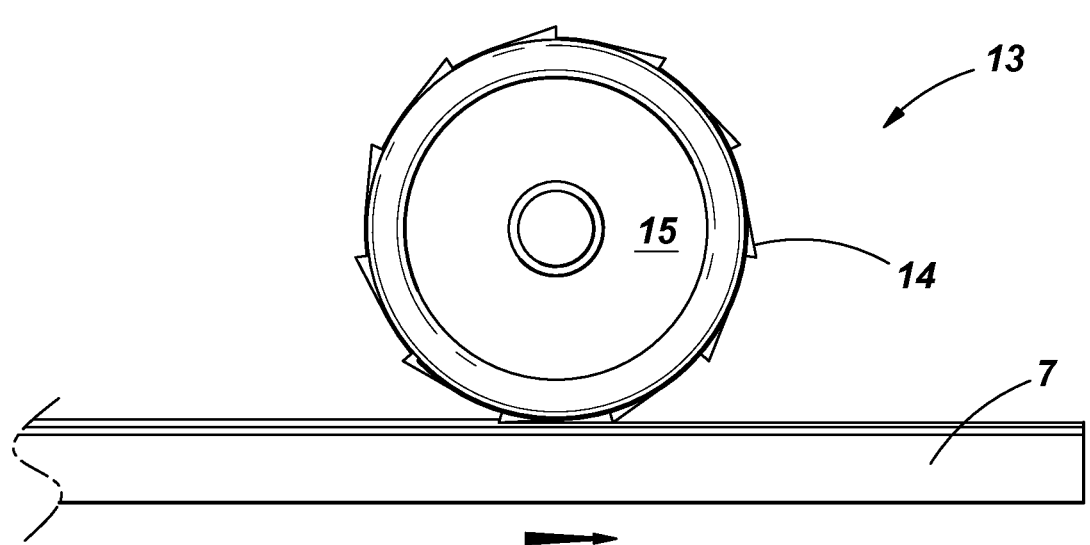
FIG. 13 shows a left side view of a planer for planning part of a top layer of the deck board of FIG. 6.
Figure 14:
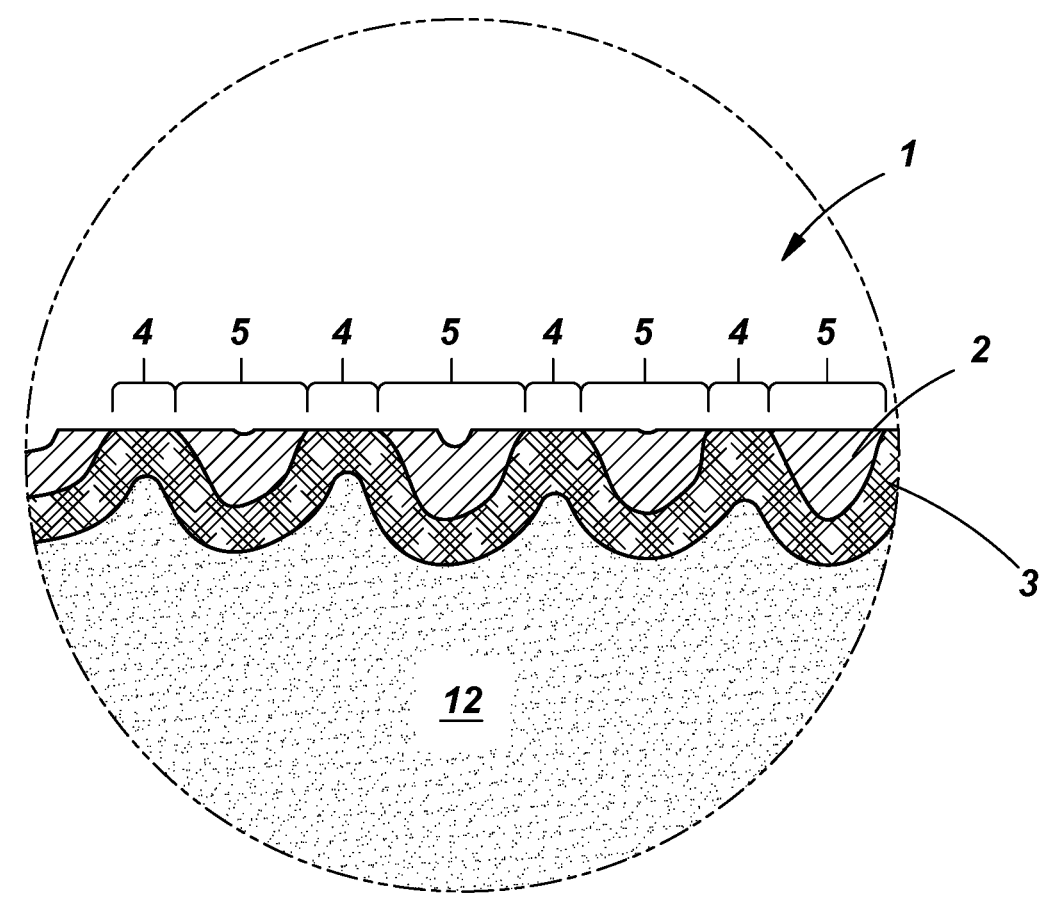
FIG. 14 shows a sectional end view of the deck board of FIG. 13 where part of the top and bottom layers are planed off.

The planing method is shown in FIG. 13. The planer 13 has a drum 15. Blades 14 extend around an outer circumference of the drum 15. The drum 15 rotates in a clockwise direction. The board 7 passes underneath the planer 13 to remove parts of the top layer 2 and bottom layer 3. As shown in FIG. 14, after parts of the top layer 2 and bottom layer 3 are removed, the board 7 displays part of the top layer 2 and part of the bottom layer 3. The layers shown may represent year growth rings 4 and 5 of a tree. The top surface of the board is smooth as a result of the sharp blades.

Figure 15:
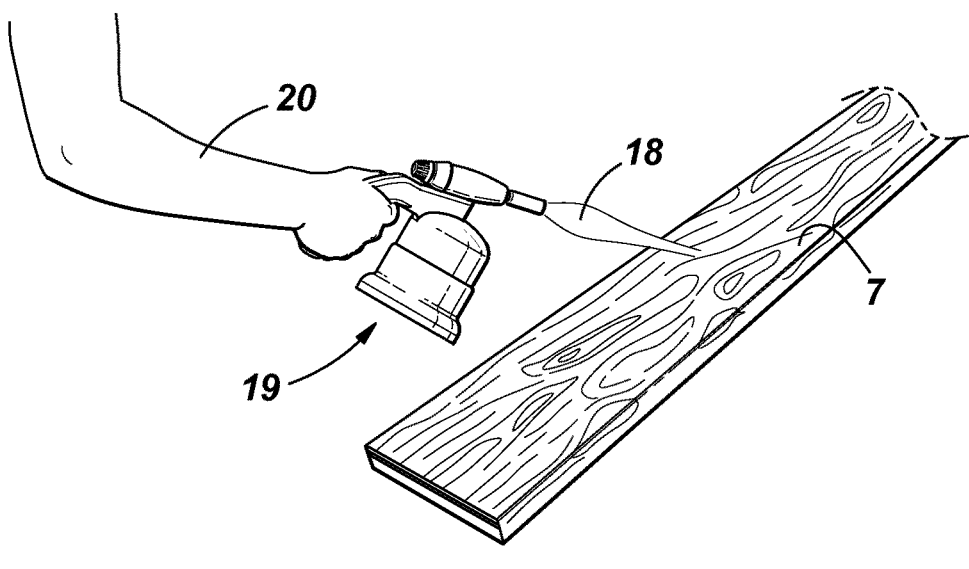
FIG. 15 shows a front right view of a worker burning part of a top layer and part of a bottom layer of a deck board.
Figure 16:
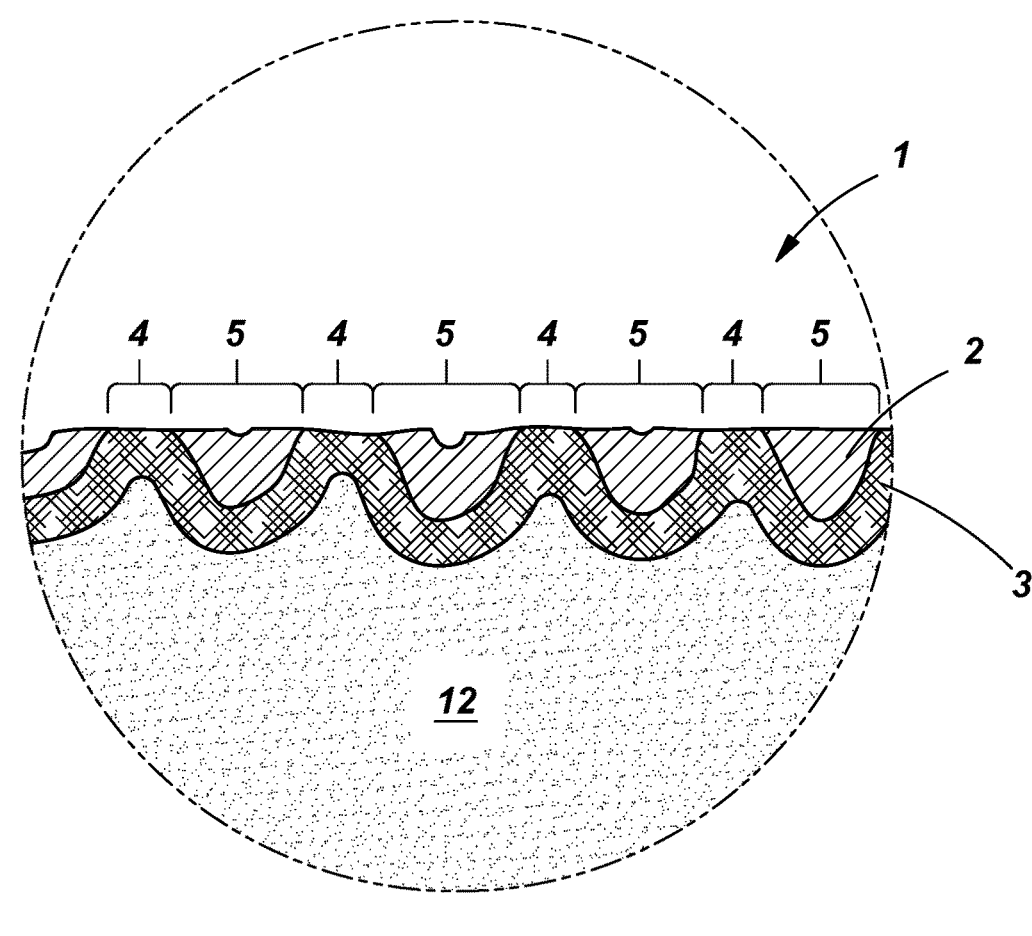
FIG. 16 shows a sectional end view of the deck board of FIG. 15 where part of the top and bottom layers are burned.

The burning method is shown in FIG. 15. The board 7 is placed on a surface with the top layer 2 operatively upwards. A user 20 has a gas blowtorch 19 with a flame 18. The user moves the flame 18 along the length of the board 7. The flame 18 heats part of the top layer 2. The top layer 2 melts and becomes thinner on some areas or may be burned away. Part of the bottom layer 3 may also be melted or burned away. In the areas where the top layer 2 may be thinner, the flame 18 heats the bottom layer to a larger extend. Molten material of the top layer 2 gathers up in valleys of the corrugations. In the areas where the top layer was either melted away, burned away or became thinner, the bottom layer 3 is more clearly visible as opposed to areas where the molten material gathered. As shown in FIG. 16, after parts of the top layer 2 and bottom layer 3 are heated, the board 7 displays part of the top layer 2 and part of the bottom layer 3. The layers shown may represent year growth rings 4 and 5 of a tree. The top surface of the board is uneven but smooth.

In all the above methods, the bottom layer 3 may become visible through thin parts of the top layer 2 when not all of the top layer 2 is removed. In the case of the planer, an abrupt change of colour i.e. of the two layers becomes visible over most of the board 7. In the case of the other methods explained above, both abrupt colour changes or gradual colour changes can be achieved.

Figure 17:
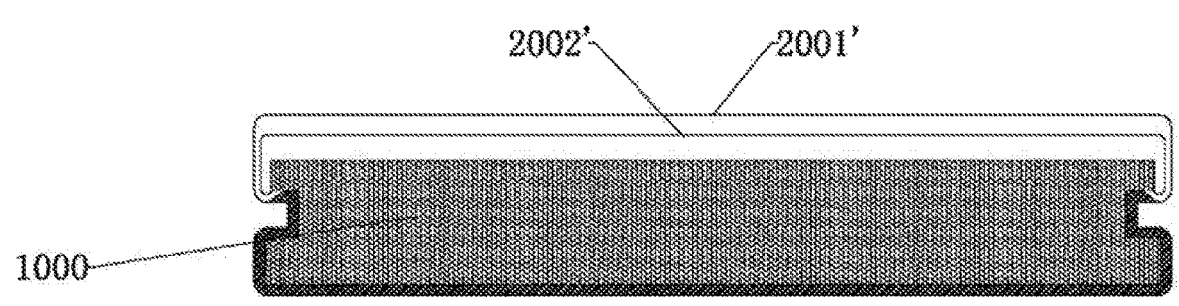
FIG. 17 is a schematic view of the structure of a floor precursor of the present invention.
Figure 18:
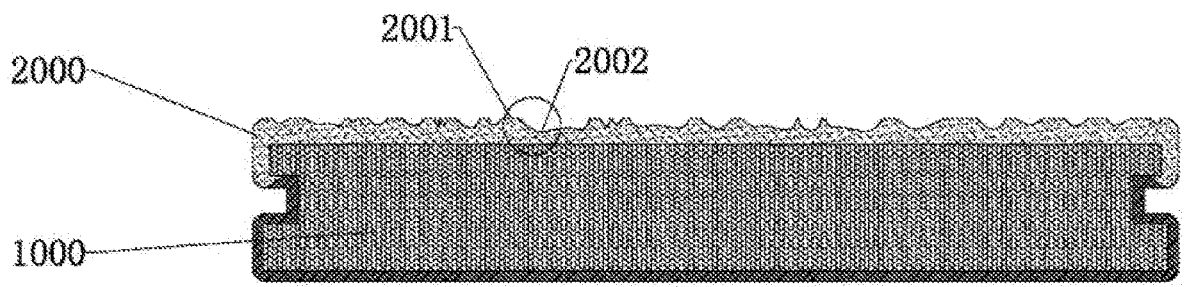
FIG. 18 is a schematic view of a co-extruded floor of the present invention.

An alternative embodiment is shown in FIGS. 17 to 23. As shown in FIG. 18, a wood-grained foamed floor includes a foamed base 1000 and a hard surface layer 2000. The hard surface layer 2000 has a three-dimensional concave-convex structure, and a convex surface is a first exposed surface 2001, and a concave surface is a second exposed surface 2002. The first exposed surface 2001 is formed of a first colour resin and is substantially parallel to one surface of the foam base 1000. And a second exposed surface 2002 formed of a second colour resin. The first colour resin and the second colour resin form a certain colour difference.

The first exposed surface 2001 is composed of a plurality of exposed units substantially in the same plane, and the second exposed surface 2002 is composed of a plurality of depressed units. The plurality of exposed units and the plurality of sinking units are arranged in a staggered mode.

Figure 19:
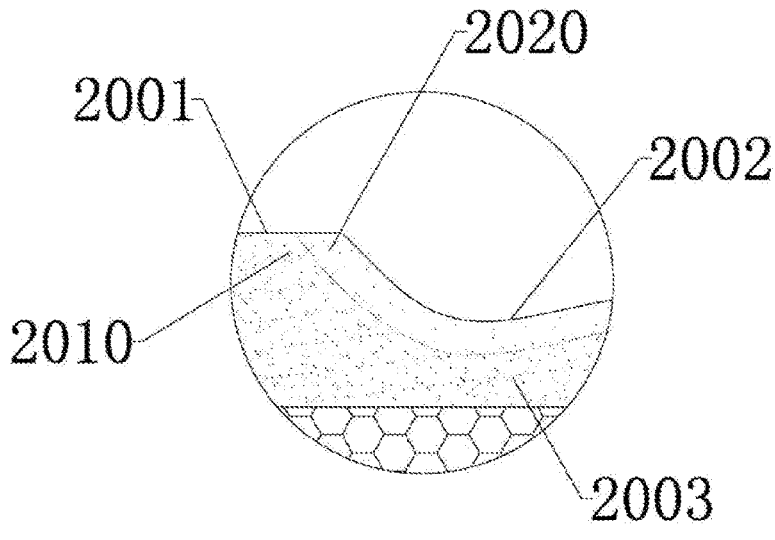
FIG. 19 is an enlarged view of a portion of FIG. 18.

As shown in FIG. 19, there is a connecting unit between adjacent exposed units and sunken units, which is a part of the hard surface layer 2000. The connection unit includes a connection base 2010 and a connection surface 2020 that are integrally connected. The connection substrate 2010 is formed of a first colour resin and is integrally connected with the first exposed surface; the connection surface material 2020 is formed of a second colour resin and covers the connection base material 2010.

The hard surface layer 2000 further includes a base layer 2003, and the base layer 2003 is formed of a first colour resin, integrally connected to a connection substrate 2010, and covered with a second exposed surface 2002.

In the wood-grain foamed floor of the present embodiment, the material of the foamed substrate 1000 is PVC micro-foam, and the material of the hard surface layer 2000 is ASA. The first exposed face 2001 has a thickness of 0.2 mm and the second exposed face 2002 has a thickness of 0.08 mm. The density was 0.72 g/cm3 The surface hardness was 72 in Rockwell hardness.

The manufacturing method of the wood texture foaming floor comprises the following steps:

a. uniformly mixing raw materials and additives for forming the foaming matrix 1000 through a high-speed mixer, adding the raw materials and the additives into a main extruder, melting and plasticizing the raw materials and the additives in the main extruder, feeding the raw materials and the additives into a main runner of a mould, extruding the raw materials and the additives from a die lip of the main runner, and feeding the raw materials and the additives into a foaming cavity of the mould for foaming to form the foaming matrix 1000;

b. uniformly mixing raw materials and additives thereof for forming first colour resin, raw materials and additives thereof for forming second colour resin, respectively adding the raw materials and additives thereof into a first auxiliary extruder and a second auxiliary extruder after being uniformly mixed by a high-speed mixer, respectively, melting and plasticizing the materials in the first auxiliary extruder and the second auxiliary extruder, respectively entering a first surface layer runner and a second surface layer runner of a mold, respectively, allowing the molten materials to respectively flow out from a straight port of the first surface layer runner and a straight port of the second surface layer runner through transverse diffusion of the first surface layer runner and the second surface layer runner, respectively entering a first surface layer casting cavity and a second surface layer casting cavity, allowing the molten materials to layer-coat a foaming matrix 1000, co-extruding and extruding the foaming matrix from a die orifice of the mold, performing hollow cooling setting in a setting die after extrusion, and forming a floor precursor structure after the setting die; as shown in FIG. 17, the pre-flooring structure has a foam layer 1000, a first skin layer 2001 'and a second skin layer 2002';

c. the floor front body structure is formed by water cooling;

d. heating the surface of the floor precursor structure after water cooling forming to soften the first surface layer 2001 'and the second surface layer 2002'; specifically, the first surface layer 2001' is heated to about 90° C. to be softened by a tunnel type heating oven with the oven temperature controlled at 200° C. for 10 s, and is suitable for being imprinted with textures;

e. pressing a partial area of the first skin layer 2001 'below the surface of the second skin layer 2002' by embossing processing by an embossing roller so that the first skin layer 2001 'and the second skin layer 2002' collectively exhibit a pre-state of wood grain;

f. polishing to make the first surface layer 2001' not pressed under the surface of the second surface layer 2002' worn, and to make the second surface layer 2002' appear on the corresponding part of the worn area; so that the pre-state of the wood grain is transformed into the wood grain.

In the above-described embodiments, the raw materials and additives for forming the foamed base 1000 and the raw materials and additives for forming the hard surface layer 2000 are conventional, and therefore, they will not be described in detail.

Figure 20:
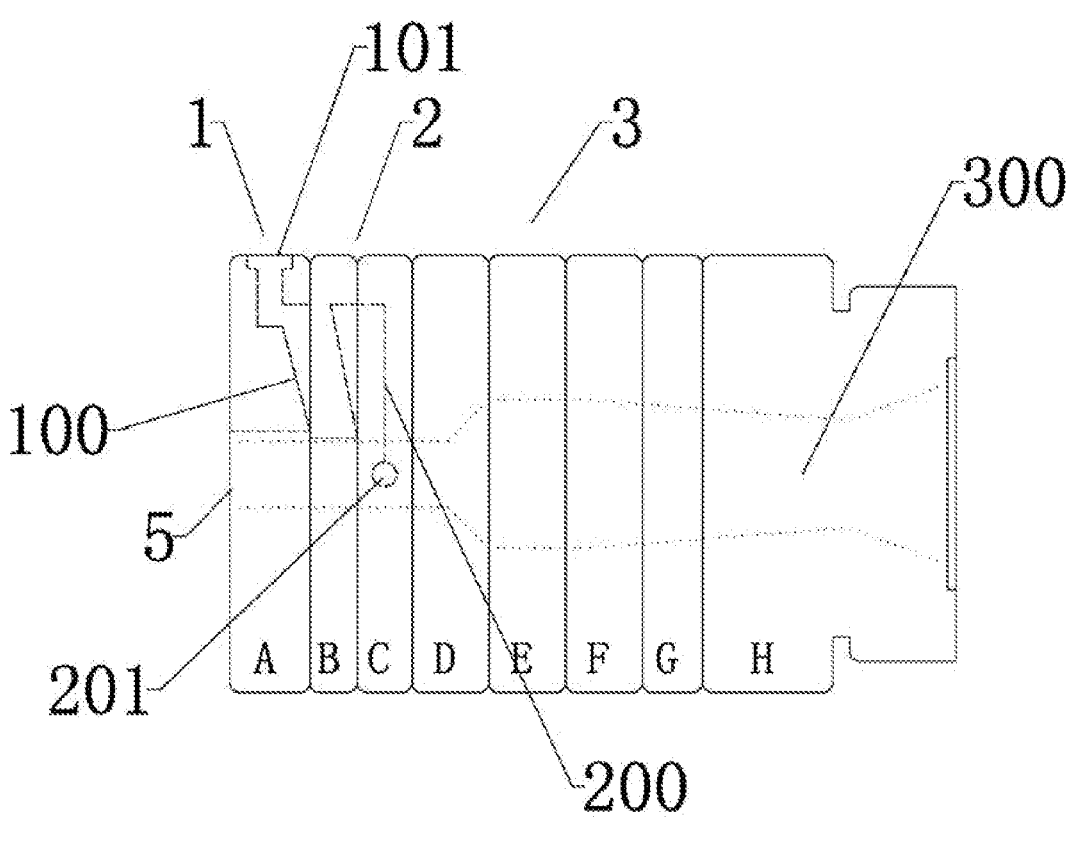
FIG. 20 is a schematic structural view of the mould of the present invention.

As shown in FIG. 20, a mould for manufacturing the foamed floor includes a main runner module 3, a second skin module 2 and a first skin module 1, which are composed of eight a-H runner plates.

The D-H plate is provided with a main runner 300 of a mould core layer, and the main runner is used for moulding a core layer foaming layer of the wood texture-imitated foaming co-extrusion floor.

Figure 23:
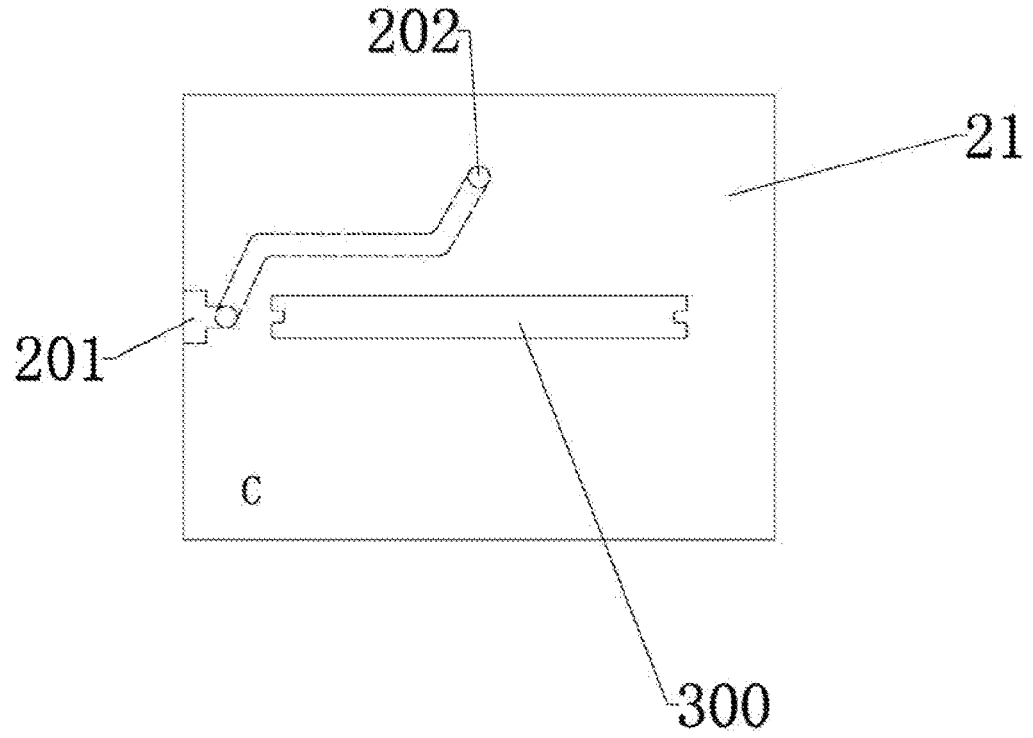

Referring to FIG. 23, the plate C is provided with a material inlet 201 of the second surface layer module and a material outlet 202 of the second surface layer feeding plate, in addition to the main runner 300 of the mould core layer. The two ports are communicated through a flow passage.

Figure 22:
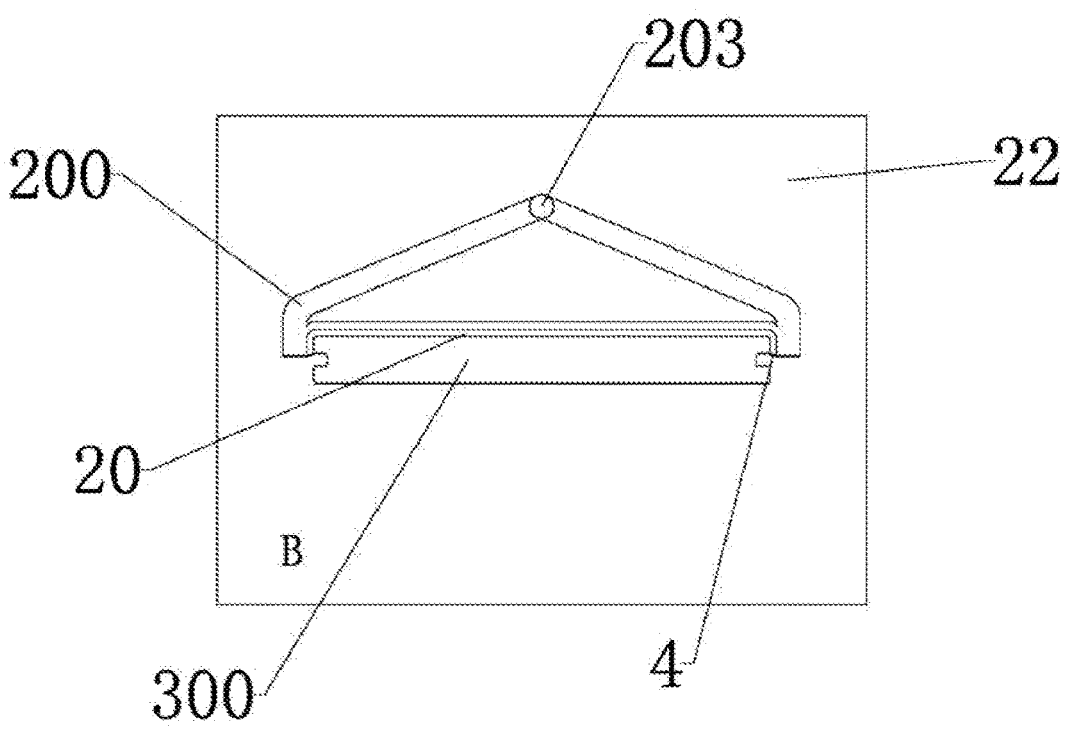
FIG. 22 is a front view of the C plate of FIG. 20.

Referring to FIG. 22, the B plate is provided with a material inlet 203 and a second surface layer runner 200 of the second surface layer forming plate, in addition to a main runner 300 of the mould core layer, and a second surface layer casting cavity 20 is formed between the second surface layer runner 200 and the main runner 300. Flow baffles 4 are further arranged at the end parts of the two sides of the second surface layer casting cavity 20. The second surface layer runner 200 is communicated with the second surface layer casting cavity 20 through a straight line; by such arrangement, the melt of the second surface layer can be coated on the core layer plate in a half-coating manner to form the first intermediate body.

The plate C is also the second surface layer feeding plate 21, and the plate B is also the second surface layer forming plate 22; the material outlet 202 of the second surface layer feeding plate is connected with the material inlet 203 of the second surface layer forming plate; the second skin tape casting cavity 20 is arranged on the second skin forming plate 22, and the material feeding port 201 of the second skin module is arranged at the side of the whole die.

The B and C plates together constitute a second skin module 2.

Figure 21:
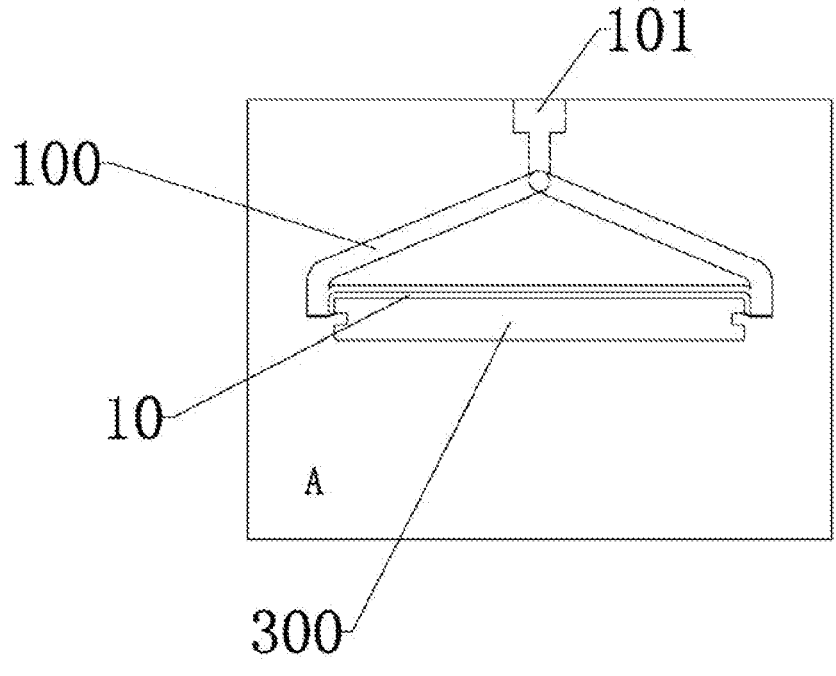
FIG. 21 is a front view of the A plate of FIG. 20.

Referring to FIG. 21, the plate a is provided with a material inlet 101 and a first surface layer runner 100 of the first surface layer module, in addition to a main runner 300 of the mould core, and a first surface layer casting cavity 10 is formed between the first surface layer runner 100 and the main runner 300. Flow baffles 4 are arranged at the end parts of the two sides of the first surface layer casting cavity 10. The first surface layer runner 100 is communicated with the first surface layer casting cavity 10 through a straight line; by the arrangement, the melt of the first surface layer is coated on the first intermediate body in a half-coating mode, and a precursor structure of the foaming floor with wood grains is formed.

In this embodiment the first skin module 1 consists solely of one flow field plate, i.e. the a-plate. The material inlet 101 and the die outlet 5 of the first skin module are both arranged on the plate, while the material inlet 101 of the first skin module is arranged on the upper part of the die.

In order to prevent the first skin layer and the second skin layer from being discoloured, the distance between the discharge port of the first skin layer casting cavity 10 and the discharge port of the second skin layer casting cavity 20 in the die plate discharge direction is not less than 0.1 mm.

The precursor structure of the foamed floor with wood texture is subjected to subsequent treatment, so that the foamed floor with wood texture can be obtained. The post-processing is realized based on two surface layers. The floor based on the two surface layers can be respectively processed by using different colours for the two surface layers, for example, the surface layers are embossed, and the surface layers are partially removed after embossing so that the surface of the floor has two layers, and the floor is expressed from the angles of solid (embossing depth), colour difference, light and shade and the like, thereby realizing the vivid effect of the texture.

It is envisaged that the invention described herein will be convenient to use to achieve different finishes on products such as cladding boards, floorboards, deck boards and the like. The invention specifically facilitates creating an enhanced wood-grain finish on such products resulting in a more natural appearance. The invention allows for more control over the colours of the board, including the pattern that the colours form. The control includes the ability to create an abrupt change from one colour to another, a gradual change from one colour to another or a combination of colours of different layers depending on how much the colour of a bottom layer is visible through a top layer i.e. how much of a top layer is removed so that the colour of the bottom layer influences the combined colour visible from above. The layers can completely envelope a board, in other words, cover all or part of the surfaces of a board and need not only cover an upper surface of a board.

It will be appreciated by those skilled in the art that the invention is not limited to the precise detail herein described. For example, instead of having a bottom layer co-extruded over the core, the core can be the bottom layer. The top layer will the be co-extruded over the core. There may also be more than three layers, for example, five layers. The invention herein described may be used to create any pattern or abstract design on a surface by way of a contrast in colours, for example, the pattern embossed in the layers may be a logo in. The top layer is then removed to display the logo. The layers may also be injection moulded.

The invention claimed is:

1. A surface finish manufacturing process comprising the steps of:

extruding a bottom layer onto a surface of a board and extruding a top layer onto the bottom layer, wherein the top layer comprises UV-resistant material and the bottom layer comprises an opaque composite material; and removing part of the top layer, or part of the top layer and part of the bottom layer, to form a wood-grain finish on the surface of the board with part of the bottom layer exposed by the removal of the part of the top layer, wherein the top and bottom layers are configured to produce a combination of abrupt and gradual transitions in colour, texture, and pattern on the surface of the board.

2. The surface finish manufacturing process as claimed in claim 1, further comprising removing part of the top layer or part of the top layer and part of the bottom layer of the board by abrading.

3. The surface finish manufacturing process as claimed in claim 1, further comprising removing part of the top layer or part of the top layer and part of the bottom layer of the board by sanding.

4. The surface finish manufacturing process as claimed in claim 1, further comprising removing part of the top layer or part of the top layer and part of the bottom layer of the board by burning.

5. The surface finish manufacturing process as claimed in claim 1, further comprising removing part of the top layer or part of the top layer and part of the bottom layer of the board by embossing.

\* \* \* \* \*